United States Patent
Deng et al.

(10) Patent No.: US 10,988,100 B2
(45) Date of Patent: Apr. 27, 2021

(54) SIDE AIRBAG INCLUDING NON-EXPANDABLE REGION

(71) Applicant: Ford Global Technologies, LLC, Dearborn, MI (US)

(72) Inventors: Zhibing Deng, Northville, MI (US); Krishnakanth E. Aekbote, Novi, MI (US); Deepak Patel, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 41 days.

(21) Appl. No.: 16/555,761

(22) Filed: Aug. 29, 2019

(65) Prior Publication Data

US 2021/0061217 A1    Mar. 4, 2021

(51) Int. Cl.
*B60R 21/231*    (2011.01)
*B60R 21/207*    (2006.01)

(52) U.S. Cl.
CPC ...... *B60R 21/23138* (2013.01); *B60R 21/207* (2013.01); *B60R 2021/23146* (2013.01)

(58) Field of Classification Search
None
See application file for complete search history.

(56) References Cited

U.S. PATENT DOCUMENTS

| | | | |
|---|---|---|---|
| 6,113,141 A * | 9/2000 | Baker | B60R 21/23138 280/730.2 |
| 6,530,595 B2 | 3/2003 | Masuda et al. | |
| 6,561,539 B1 | 5/2003 | Sunabashiri et al. | |
| 6,802,529 B2 | 10/2004 | Takedomi et al. | |
| 7,448,645 B2 | 11/2008 | Bederka et al. | |
| 7,559,573 B2 | 7/2009 | Fukawatase et al. | |
| 7,614,650 B2 * | 11/2009 | Yokota | B60R 21/237 280/729 |
| 7,753,407 B2 * | 7/2010 | Yokota | B60R 21/20 280/743.2 |
| 7,793,973 B2 | 9/2010 | Sato et al. | |
| 7,819,423 B2 | 10/2010 | Loibl et al. | |
| 7,871,104 B2 | 1/2011 | Hayashi | |
| 7,954,844 B2 | 6/2011 | Kamiyama | |
| 8,246,076 B2 | 8/2012 | Schmidt et al. | |
| 8,322,747 B2 | 12/2012 | Shankar | |
| 8,448,981 B2 | 5/2013 | Fukawatase | |
| 8,596,674 B2 | 12/2013 | Fukawatase et al. | |

(Continued)

FOREIGN PATENT DOCUMENTS

| | | |
|---|---|---|
| JP | H10273010 A | 10/1998 |
| JP | H1148906 A | 2/1999 |

(Continued)

*Primary Examiner* — Faye M Fleming
(74) *Attorney, Agent, or Firm* — Frank A. MacKenzie; Bejin Bieneman PLC

(57) ABSTRACT

A side airbag assembly includes a seatback and a side airbag supported by the seatback. The side airbag has a first panel and a second panel. The first panel and the second panel have an expandable region including an inflation chamber. The first panel and the second panel are connected to each other defining a substantially non-expandable region. The first panel and the second panel are connected to each other around an opening. The opening extends through the first panel and the second panel and the opening is between and adjacent to the substantially non-expandable region and the expandable region.

20 Claims, 7 Drawing Sheets

(56) References Cited

U.S. PATENT DOCUMENTS

| | | |
|---|---|---|
| 9,399,440 B2 | 7/2016 | Fujiwara |
| 2005/0189742 A1 | 9/2005 | Kumagai et al. |
| 2006/0022441 A1 | 2/2006 | Hayashi et al. |
| 2007/0164546 A1 | 7/2007 | Kai et al. |
| 2007/0170707 A1 | 7/2007 | Sato et al. |
| 2009/0039626 A1 | 2/2009 | Yokota |
| 2011/0012327 A1 | 1/2011 | Enders |
| 2014/0138938 A1 | 5/2014 | Kobayashi |
| 2014/0375032 A1 | 12/2014 | Fukawatase et al. |
| 2016/0221528 A1 | 8/2016 | Sugimura et al. |

FOREIGN PATENT DOCUMENTS

| | | |
|---|---|---|
| JP | H11180244 A | 7/1999 |
| JP | 4720714 B2 | 4/2011 |
| JP | 2014133462 A | 7/2014 |
| JP | 2014189074 A | 10/2014 |
| KR | 1020070066282 A | 6/2007 |

\* cited by examiner

SIDE AIRBAG INCLUDING NON-EXPANDABLE REGION

BACKGROUND

A vehicle may include one or more airbags deployable during a vehicle impact to control kinematics of occupants inside the vehicle during the impact. The airbag may be a component of an airbag assembly including a housing supporting the airbag, and an inflation device in communication with the airbag for inflating the airbag from an uninflated position to an inflated position.

DETAILED DESCRIPTION

Figure 1:
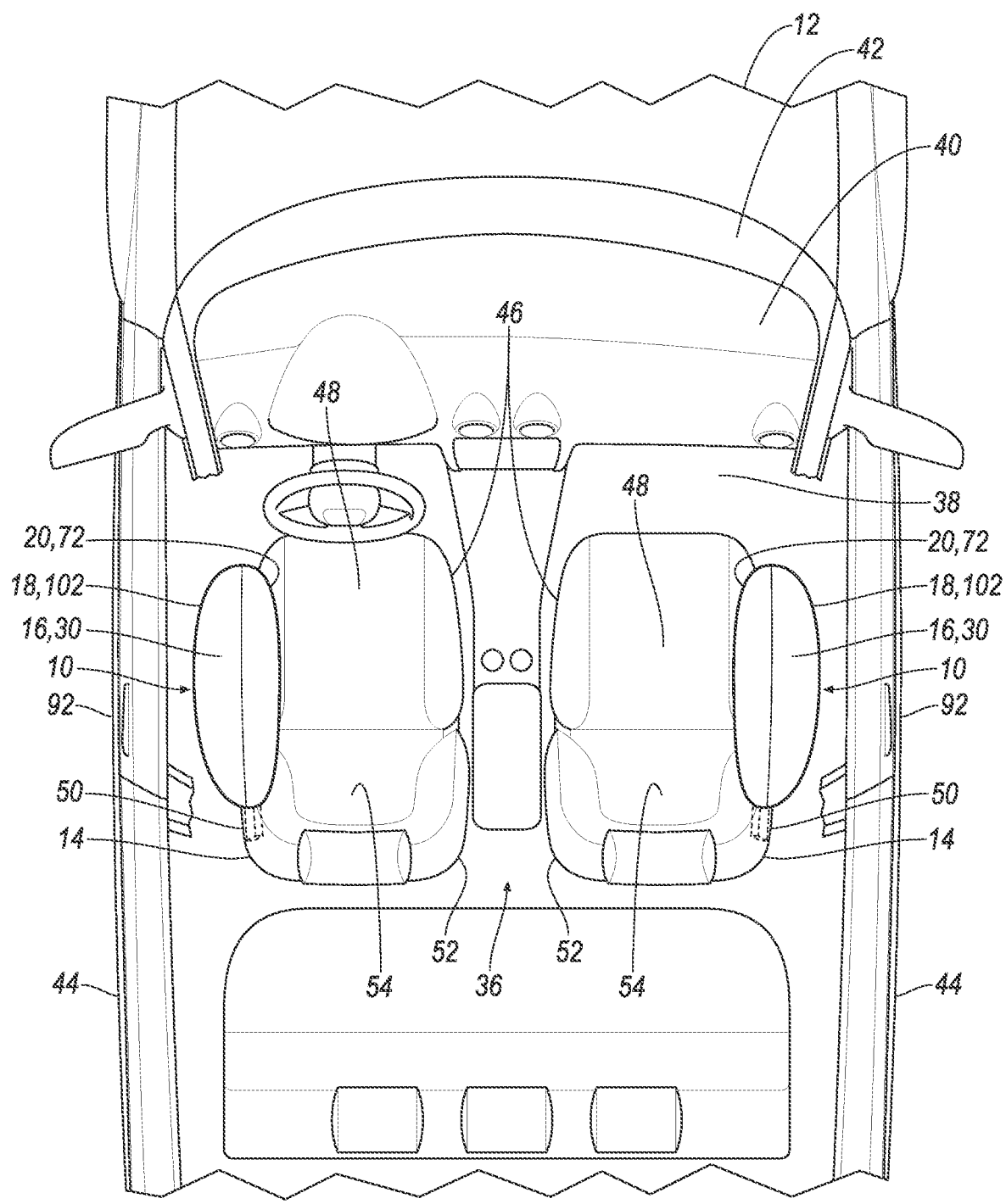
FIG. 1 is a top view of a vehicle including two side airbag assemblies.

An assembly includes a seatback and a side airbag supported by the seatback. The side airbag has a first panel and a second panel. The first panel and the second panel have an expandable region including an inflation chamber. The first panel and the second panel are connected to each other defining a substantially non-expandable region. The first panel and the second panel are connected to each other around an opening. The opening extends through the first panel and the second panel. The opening is between and adjacent to the substantially non-expandable region and the expandable region.

The non-expandable region may be at a bottom, vehicle-rearward corner of the side airbag.

The side airbag may have a bottom edge and a vehicle-rearward edge and the non-expandable region extends along the bottom edge and the vehicle-rearward edge. The opening may have a bottom end and a vehicle-rearward end, and the non-expandable region extends from the bottom edge of the side airbag to the bottom end of the opening and the non-expandable region extends from the vehicle-rearward edge of the side airbag to the vehicle-rearward end of the opening. The opening may have a vehicle-forward end, and the non-expandable region extends continuously along the bottom edge of the side airbag from the vehicle-rearward edge of the side airbag to the vehicle-forward end of the opening. The opening may have a top end, and the non-expandable region extends continuously along the vehicle-rearward edge of the side airbag from the bottom edge of the side airbag to the top end of the opening. The expandable region may extend from the top end and the vehicle-forward end of the opening. The opening may have a top end, and the non-expandable region extends continuously along the vehicle-rearward edge of the side airbag from the bottom edge of the side airbag to the top end of the opening.

The side airbag may be designed to be positioned in an inflated position with the opening substantially aligned with an iliac wing of a side-impact dummy. The side airbag may be designed to be positioned in the inflated position with the expandable region extending from the opening along a torso and leg of the side-impact dummy.

In another example, a side airbag includes a first panel and a second panel, the first panel and the second panel having an expandable region including an inflation chamber. The first panel and the second panel are connected to each other defining a substantially non-expandable region. The first panel and the second panel are connected to each other around an opening, the opening extending through the first panel and the second panel, the opening being between and adjacent to the substantially non-expandable region and the expandable region.

The non-expandable region may be at a bottom, vehicle-rearward corner of the first panel and the second panel.

The first panel and the second panel may have a bottom edge and a vehicle-rearward edge and the non-expandable region extends along the bottom edge and the vehicle-rearward edge. The opening may have a bottom end and a vehicle-rearward end, and the non-expandable region extends from the bottom edge of the first panel and the second panel to the bottom end of the opening and the non-expandable region extends from the vehicle-rearward edge of the first panel and the second panel to the vehicle-rearward end of the opening. The opening may have a vehicle-forward end, and the non-expandable region extends continuously along the bottom edge of the first panel and the second panel from the vehicle-rearward edge of the first panel and the second panel to the vehicle-forward end of the opening. The opening may have a top end, and the non-expandable region extends continuously along the vehicle-rearward edge of the first panel and the second panel from the bottom edge of the first panel and the second panel to the top end of the opening. The expandable region may extend from the top end and the vehicle-forward end of the opening. The opening may have a top end, and the non-expandable region extends continuously along the vehicle-rearward edge of the first panel and the second panel from the bottom edge of the first panel and the second panel to the top end of the opening.

The first panel and the second panel may be designed to be positioned in an inflated position with the opening substantially aligned with the iliac wing of a side-impact dummy. The first panel and the second panel may be designed to be positioned in the inflated position with the expandable region extending from the opening along a torso and leg of a side impact dummy.

With reference to the Figures, wherein like numerals indicate like parts throughout the several views, a side airbag assembly 10 of a vehicle 12 is generally shown. The side airbag assembly 10 includes a seatback 14 and a side airbag 16 supported by the seatback 14. The side airbag 16 has a first panel 18 and a second panel 20. The first panel 18 and the second panel 20 have an expandable region 22 including an inflation chamber 24. The first panel 18 and the second panel 20 are connected to each other defining a substantially non-expandable region 26 (hereinafter referred to as the "non-expandable region 26"). The first panel 18 and the second panel 20 are connected to each other around an opening 28. The opening 28 extends through the first panel 18 and the second panel 20 and the opening 28 is between and adjacent to the substantially non-expandable region 26 and the expandable region 22.

Figure 2:
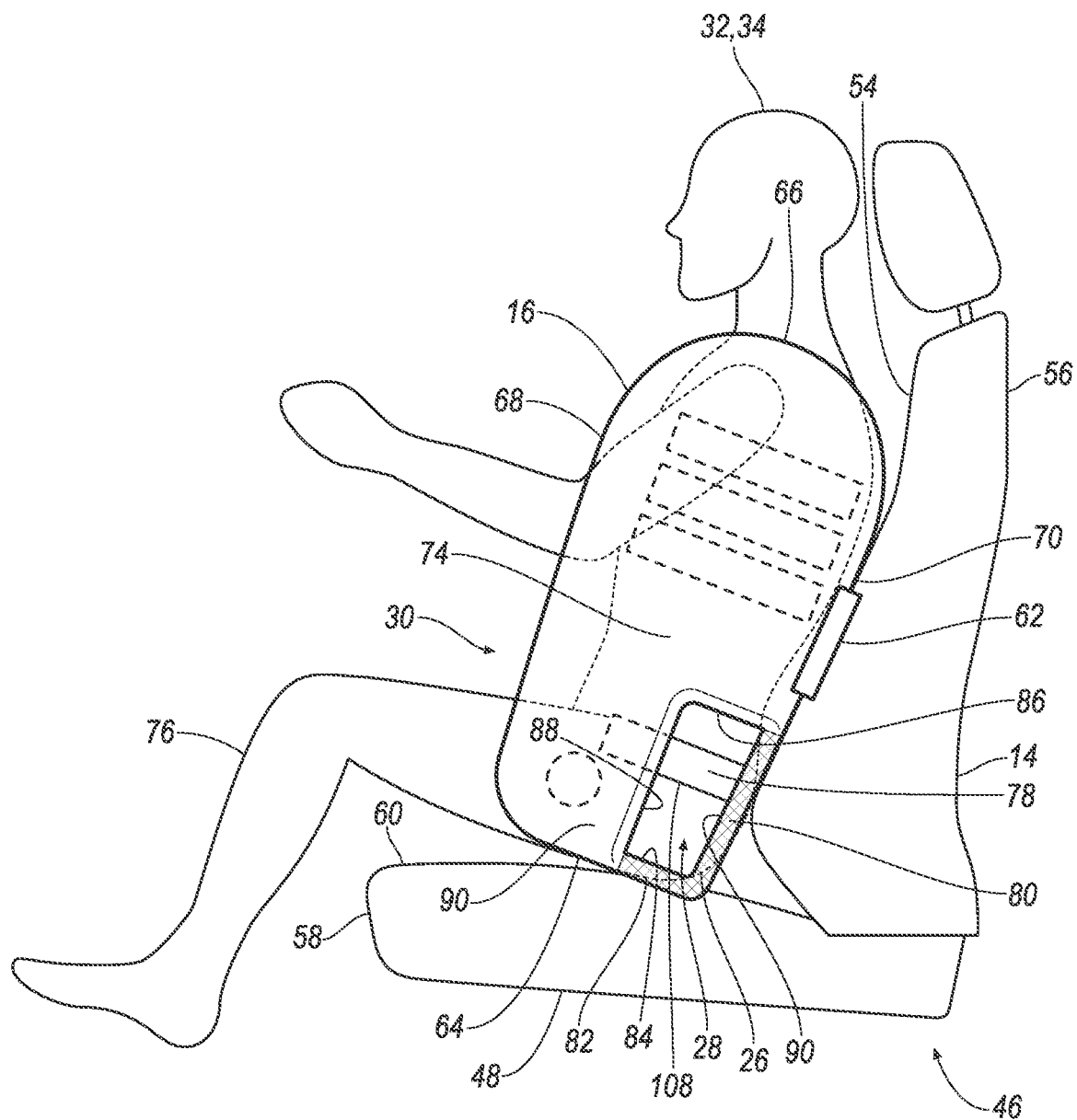
FIG. 2 is a side view of the side airbag assembly supported by a seat with a side impact dummy occupying the seat.

The side airbag 16 is inflatable to an inflated position 30, shown in FIG. 2, to control the kinematics of the vehicle occupant 32. Specifically, in the inflated position 30, the opening 28 and the non-expandable region 26 are positioned to be adjacent to portions of a side impact dummy 34, e.g., areas of the pelvis 108 and/or the torso 74, to, at least in part, control the positioning and loading of the side impact dummy 34. The opening 28 reduces the amount of inflation medium to inflate the side airbag 16 and reduces the weight of the side airbag 16. The non-expandable region 26 of the side airbag 16 assists in controlling the shape of the side airbag 16 during inflation and in the inflated position 30.

The vehicle 12 may be any suitable type of automobile, e.g., a passenger or commercial automobile such as a sedan, a coupe, a truck, a sport utility vehicle, a crossover vehicle, a van, a minivan, a taxi, a bus, etc. With reference to FIG. 1, the vehicle 12 includes a passenger cabin 36 to house occupants 32, if any, of the vehicle 12. The vehicle 12 includes a roof (not numbered) above the passenger cabin 36 and a floor 38 below the passenger cabin 36. The vehicle 12 may include a front dash 40 and/or a front windshield 42 that are vehicle-forward of the passenger cabin 36 (where "vehicle-forward" is with reference to forward movement of the vehicle 12). The vehicle 12 includes an outboard side 44 on each side of the passenger cabin 36.

With reference to FIG. 1, the vehicle 12 includes one or more seats 46. The seats 46 may be arranged in the passenger cabin 36 in any suitable position, i.e., as front seats, rear seats, third-row seats, etc. The seats 46 may be moveable relative to the floor 38 to various positions, e.g., movable fore-and-aft and/or cross vehicle 12. The seats 46 may be of any suitable type, e.g., a bucket seat as shown in FIG. 1. As an example, shown in FIG. 1, the vehicle 12 includes two seats positioned as front seats with the side airbag 16 inflatable in the vehicle-forward direction toward the front dash 40. In other examples, vehicle 12 may include any suitable number of seats supporting the airbags in any suitable position.

The seat includes the seatback 14 and a seat bottom 48. The seatback 14 may be supported by the seat bottom 48 and may be stationary or moveable relative to the seat bottom 48. The seatback 14 and the seat bottom 48 may be adjustable in multiple degrees of freedom. Specifically, the seatback 14 and the seat bottom 48 may themselves be adjustable, in other words, adjustable components within the seatback 14 and/or the seat bottom 48, and/or may be adjustable relative to each other.

The seatback 14 includes a first side 50, a second side 52, a front 54 extending between the first side 50 and the second side 52, and a rear 56 extending between the first side 50 to the second side 52. When the seat is in the forward-facing position, the front 54 of the seat 46 faces vehicle-forward and the rear 56 of the seat 46 faces vehicle-rearward. The seatback 14 defines an occupant seating area on the front between the first side 50 and the second side 52. When the occupant 32 occupies the seat, the back of the occupant 32 leans against the occupant seating area.

The seatback 14 may include a seatback frame and a covering supported on the seatback frame. The seatback frame may include tubes, beams, etc. Specifically, the seatback frame includes a pair of upright frame members at the first side 50 and the second side 52, respectively, of the seatback 14. The upright frame members are elongated and specifically, are elongated in a generally upright direction when the seatback 14 is in a generally upright position. The upright frame members are spaced from each other and the seatback frame includes cross-members extending between the upright frame members. The seatback frame may be of any suitable plastic material, e.g., carbon fiber reinforced plastic (CFRP), glass fiber reinforced semi-finished thermoplastic composite (organosheet), etc. As another example, some or all components of the seatback frame may be a suitable metal, e.g., a steel, aluminum, etc.

The seat bottom 48 includes a first side 98, a second side 100, a front side 58 extending between the first side 98 and the second side 100, and a top side 60 extending between the first side 98 and the second side 100 When the seat is in the forward-facing position, the front of the seat faces vehicle-forward, and the top of the seat faces the vehicle 12 roof. When the occupant 32 occupies the seat, the bottom of the occupant 32 rests on the top side 60 of the seat bottom 48. The seat bottom 48 may include a seat bottom 48 frame and a covering supported on the seat bottom 48 frame. The seat bottom 48 frame may include tubes, beams, etc. The seat bottom 48 frame may be of any suitable plastic material, e.g., carbon fiber reinforced plastic (CFRP), glass fiber reinforced semi-finished thermoplastic composite (organosheet), etc. As another example, some or all components of the seat bottom 48 frame may be a suitable metal, e.g., a steel, aluminum, etc.

The covering may include upholstery and padding. The upholstery may be cloth, faux leather, or any other suitable material. The upholstery may be stitched in panels around the frame. The padding may be between the covering and the seatback frame and may be foam or any other suitable material. The covering may include a tear seam adjacent to the airbag. The airbag tears and extends through the tear seam in the inflated position 30.

The vehicle 12 includes the side airbag assembly 10, which includes the side airbag 16. The side airbag 16 is inflatable from an uninflated position (not shown) to the inflated position 30. In the inflated position 30, the side airbag 16 controls the kinematics of the occupant 32 in vehicle impacts that urge the occupant 32 in a cross-vehicle direction, e.g., a near-side impact may urge the occupant 32 toward the outboard side 44 of the vehicle 12.

The side airbag 16 is supported by the seatback 14. As an example, the side airbag assembly 10 may include a housing 62 that supports the airbag on the seatback 14 when the side airbag 16 is uninflated and when the side airbag 16 is in the inflated position 30. In such an example, the side airbag 16 may be folded in the housing 62 when the side airbag 16 is uninflated. The housing 62 may be mounted to the seatback frame, e.g., one of the frame members, and/or may be a component of the seatback frame. The housing 62 may be, for example, plastic. The airbag assembly may be concealed to by the cover and may break through the tear seam as the side airbag 16 inflates to the inflated position 30.

The side airbag assembly 10 may include an inflator (not numbered). The inflator is in fluid communication with the side airbag 16 to inflate the side airbag 16 with an inflation medium such as a gas. The inflator may be, for example, a pyrotechnic inflator that uses a chemical reaction to drive inflation medium to the airbag. The inflator may be of any suitable type, for example a cold-gas inflator.

The side airbag 16 has a bottom edge 64, a top edge 66, a vehicle-forward edge 68, and a vehicle-rearward edge 70. The side airbag 16 terminates at the bottom edge 64, a top edge 66, a vehicle-forward edge 68, and a vehicle-rearward edge 70. The side airbag 16 has an inboard side 72 and an outboard side 102. For example, the outboard side 102 faces a door 92 of the vehicle 12 and the inboard side 72 faces the occupant seating area when the side airbag 16 is in the inflated position 30. The inboard side 72 and the outboard side 102 may each extend to and terminate at the bottom edge 64, the top edge 66, the vehicle-forward edge 68, and the vehicle-rearward edge 70.

The side airbag 16 includes the first panel 18 and the second panel 20. One of the first panel 18 and the second panel 20 may be on the inboard side 72 of the side airbag 16 and the other of the first panel 18 and the second panel 20 may be on the outboard side 102 of the side airbag 16. The first panel 18 and the second panel 20 each extend to the bottom edge 64, the top edge 66, the vehicle-forward edge 68, and the vehicle-rearward edge 70.

The expandable region 22 is along the first panel 18 and the second panel 20. Specifically, as set forth above, the first panel 18 and the second panel 20 define the inflation chamber 24 therebetween. The inflation chamber 24 extends along the expandable region 22. The inflation chamber 24 receives inflation medium from the inflator to inflate the side airbag 16 to the inflated position 30. The expandable region 22 is designed to inflate with inflation medium to an increased size and pressure to control the kinematics of the occupant 32 during a vehicle impact.

The side airbag 16, including the first panel 18 and second panel 20, may be of any suitable type of material, e.g., a woven polymer. For example, the side airbag 16 may be a woven nylon yarn, e.g., nylon 6, 6. Other suitable examples include polyether ether ketone (PEEK), polyehterketoneketone (PEKK), polyester, or any other suitable polymer. The woven polymer may include a coating such as silicone, neoprene, urethane, polyogranosiloxane, etc.

The first panel 18 and the second panel 20 may have a vent (not numbered) to vent the inflation chamber 24 to the atmosphere. The vent may be any suitable type of vent, e.g., the vent may be a passive vent, an active vent, a two-way vent, etc. The vent may have a tether (not numbered). The tether may be an internal tether or an external tether. The tether may be of any suitable material.

As set forth above, the side airbag 16 includes the non-expandable region 26 and the opening 28. In the inflated position 30, the side airbag 16 is positioned with the expandable region 22 and the inflation chamber 24 extending from the opening 28 along the torso 74 and leg 76 of the side impact dummy. In other words, the inboard side 72 faces the dummy and the expandable region 22 is between the torso 74 of the side impact dummy 34 and the door 92 and between leg 76 of the dummy and the door 92. In the inflated position 30, the side airbag 16 is designed to be positioned with the opening 28 substantially aligned with an iliac wing 78 of the side impact dummy.

As one example, the side impact dummy 34 may be a SID-IIs Small Side impact dummy. The SID-IIs side impact dummy may be used in vehicle 12 side-impact tests. The anthropometry of the SID-IIs Side impact dummy is based on the Hybrid III $5^{th}$ Female Dummy and generally corresponds to the approximate size and weight of a 12-13 year old child. The crash test dummy may be of any suitable type, i.e., includes instrumentation for measuring attributes of impact to anatomical features.

The first panel 18 and the second panel 20 are connected to each other. Specifically, the first panel 18 and the second panel 20 may be connected directly to each other, as shown in the figures, or, as another example, may be connected indirectly to each other with an intermediate panel. As an example, the first panel 18 and the second panel 20 may be directly connected to each other along at least one of the bottom edge 64, the top edge 66, the vehicle-forward edge 68, the vehicle-rearward edge 70, the opening 28, and the non-expandable region 26. In the example shown in the figures, the first panel 18 and the second panel 20 are connected to each other along each of the bottom edge 64, the top edge 66, the vehicle-forward edge 68, the vehicle-rearward edge 70, the opening 28, and the non-expandable region 26.

The first panel 18 and the second panel 20 may be connected in any suitable fashion. As an example, the first panel 18 and the second panel 20 may be connected by connections 94 between the first panel 18 and the second panel 20. The connections 94 may be, for example, stitching (e.g., with thread, yarn, etc.), weld lines (e.g., from ultrasonic welding), adhesive, etc. In other words, the first panel 18 and the second panel 20 are formed separately and subsequently connected. As another example of being connected, the first panel 18 and the second panel 20 may be unitary with each other, i.e., the first panel 18 and the second panel 20, in combination, are a single, uniform piece of material with no seams, joints, fasteners, or adhesives holding them together. As an example, the first panel 18 and the second panel 20 may be woven as a unitary piece of fabric.

The first panel 18 and the second panel 20 are connected to each other around the expandable region 22. For example, connections 94 may extend around the inflation chamber 24 to define the expandable region 22.

Figure 6:
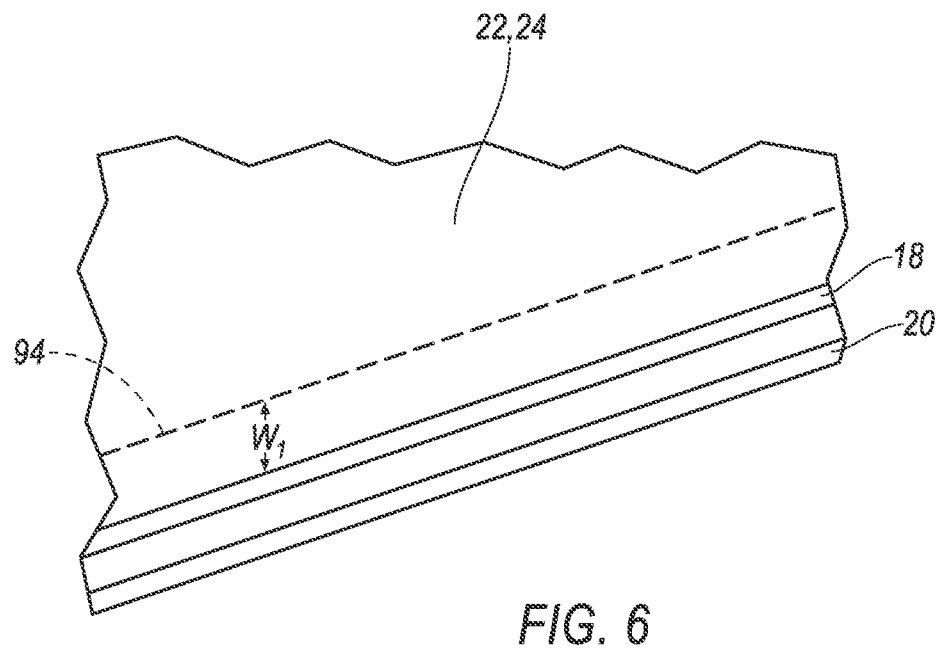
FIG. 6 is a perspective view of the connection between a first panel and a second panel of the airbag.
Figure 7:
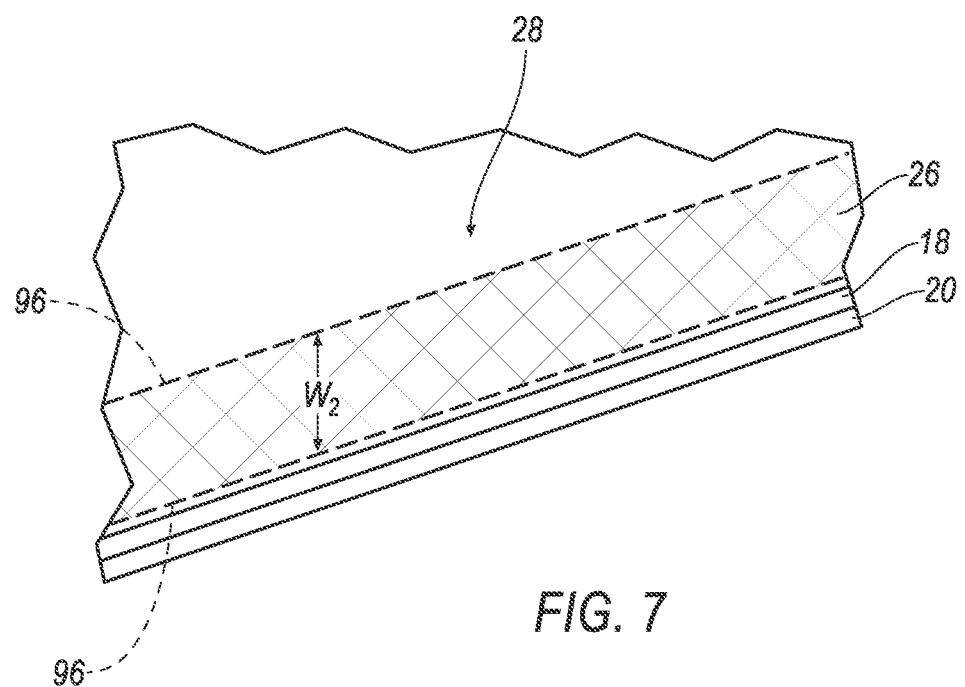
FIG. 7 is a perspective view of the connection between the first panel and the second panel forming the non-expandable region.

The first panel 18 and the second panel 20 are connected to each other defining the non-expandable region 26. In other words, the non-expandable region 26 is a region in which the first panel 18 and the second panel 20 are connected to each other. Specifically, the connection 96 between the first panel 18 and the second panel 20 (e.g., the connections 94, 96) at the non-expandable region 26 substantially prevents or completely prevents the flow of inflation medium from the inflation chamber 24 to between the first panel 18 and the second panel 20 at the non-expandable region 26. The connections 94 may extend in both the vehicle-forward/rearward directions and in vertical directions to define the width of the non-expandable region 26. Specifically, in examples in which connections 94 connect the first panel 18 and the second panel 20 around the expandable region 22, the non-expandable region 26 is wider than the connections 94 around the expandable region 22. As an example, as shown in FIG. 6, the connection 94 is stitching having a width W1 and, as shown in FIG. 7, the connection 96 is a plurality of stitches spaced from each other defining a width W2 of the non-expandable region 26.

The non-expandable region 26 may be L-shaped. Specifically, the non-expandable region 26 may include an upper leg 80 and a lower leg 82 that meet at a corner 104. In the inflated position 30, the upper leg 80 extends downwardly from the expandable region 22 to the corner 104 and the lower leg 82 extends vehicle-rearward from the expandable region 22 to the corner 104. The side airbag 16 includes a bottom, vehicle-rearward corner 106, and the corner 104 of the non-expandable region 26 may be the bottom, vehicle-rearward corner 106 of the side airbag 16. The width W2 of the non-expandable region 26 may be substantially constant along the upper leg 80 and the lower leg 82.

The first panel 18 and second panel 20 are connected to each other around the opening 28. For example, connections 94 may extend around the opening 28 to define the opening 28.

The opening 28 extends through the first panel 18 and the second panel 20, i.e., the opening 28 is continuous from the outboard side 102 of the side airbag 16 to the inboard side 72 of the side airbag 16 with no intermediate material or medium in the opening 28. The opening 28 is between and adjacent to the non-expandable region 26 and the expandable region 22. In other words, the opening 28 extends from the The opening 28 has a bottom end 84, a top end 86, a vehicle-forward end 88, and a vehicle-rearward end 90. As an example, the top end 86 and the vehicle-forward end 88 of the opening 28 may be adjacent to, i.e. directly abutting, the inflation chamber 24, and the bottom end 84 and vehicle-rearward end 90 of the opening 28 may be adjacent to, i.e., directly abutting, the non-expandable region 26. The opening 28 may be, for example, rectangular.

As set forth above, the opening 28 is designed to be positioned with the opening 28 substantially aligned with an iliac wing 78 of the side impact dummy 34. As an example, the non-expandable region 26 is at the bottom, vehicle-rearward corner of the side airbag 16, and extends along the bottom edge 64 and the vehicle-rearward edge 70 of the side airbag 16. Specifically, the non-expandable region 26 extends from the bottom edge 64 of the side airbag 16 to the bottom end 84 of the opening 28 and the non-expandable region 26 extends from the vehicle-rearward edge 70 of the side airbag 16 to the vehicle-rearward end 90 of the opening 28.

The non-expandable region 26 positions the portion of inflation chamber 24 extending from the vehicle-forward end 88 of the opening 28 to the vehicle-forward edge 68 of the side airbag 16 and extending from the bottom edge 64 of the side airbag 16 to the top end 86 of the opening 28. In other words, the non-expandable region 26 operates as a tether to control relative movements of the airbag at the vehicle-forward end 88 of the opening 28 and the top end 86 of the opening 28.

Figure 3:
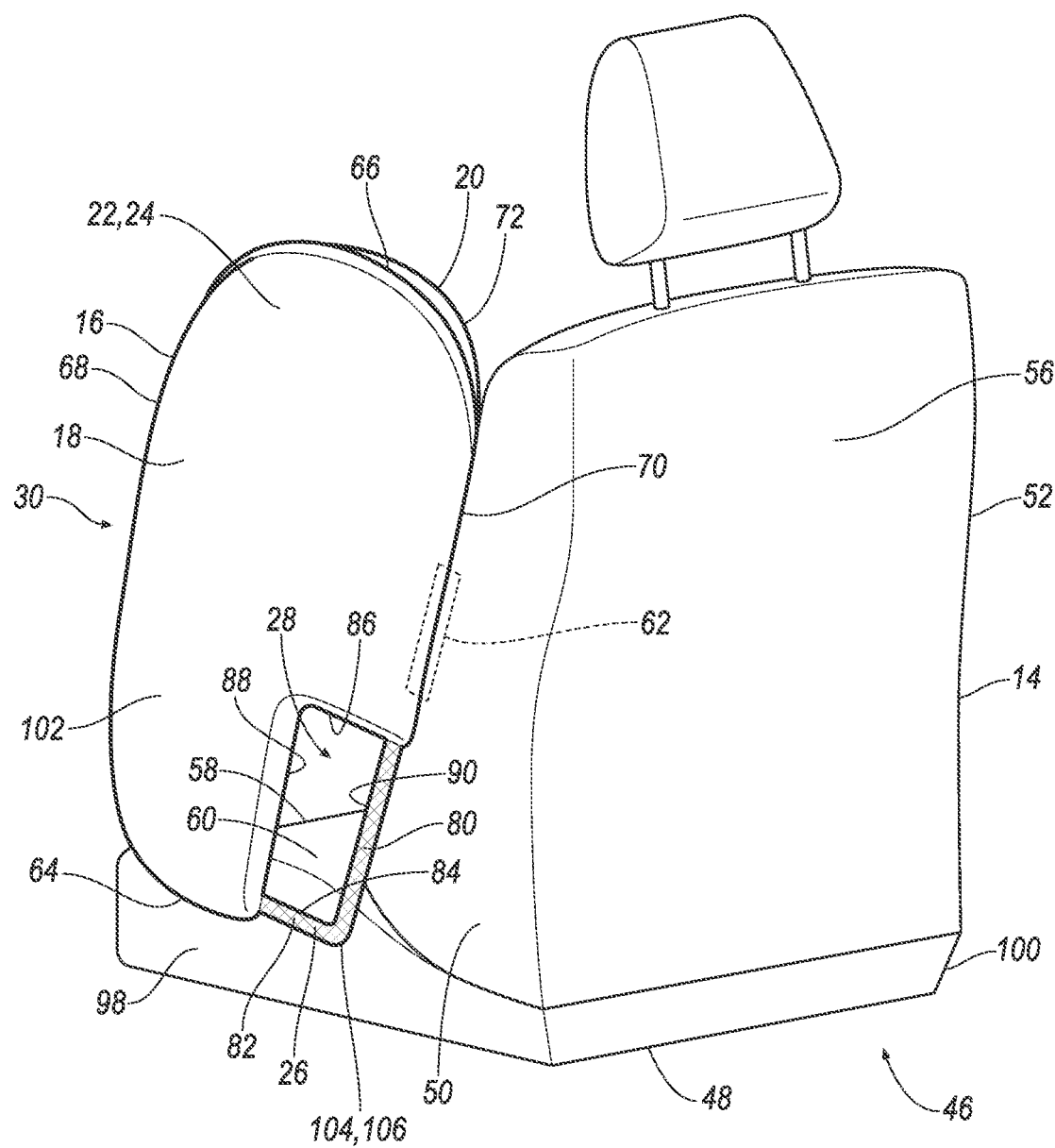
FIG. 3 is a perspective view of the seat with the side airbag inflated.
Figure 4:
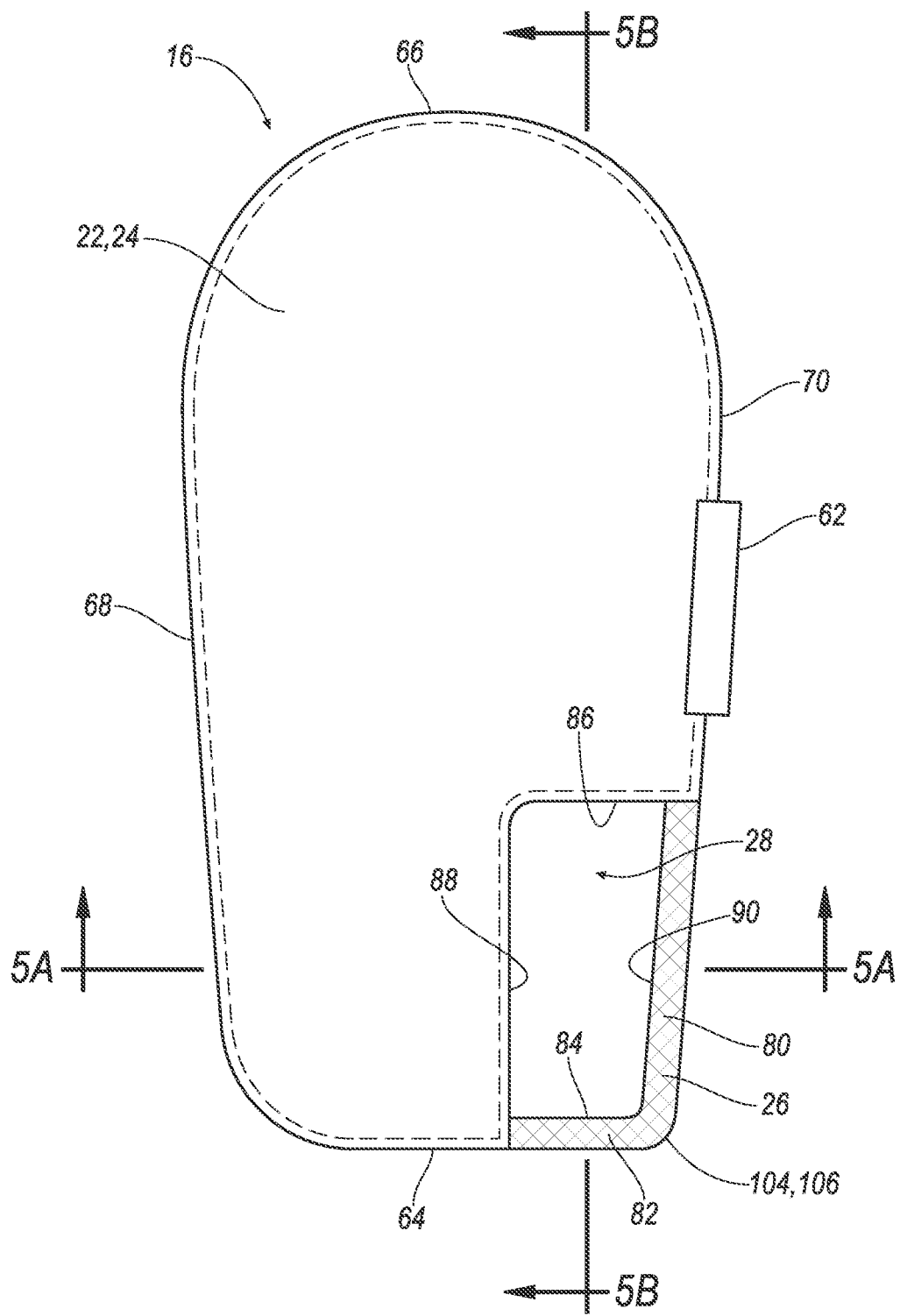
FIG. 4 is a side view of the side airbag assembly.
Figure 5A:
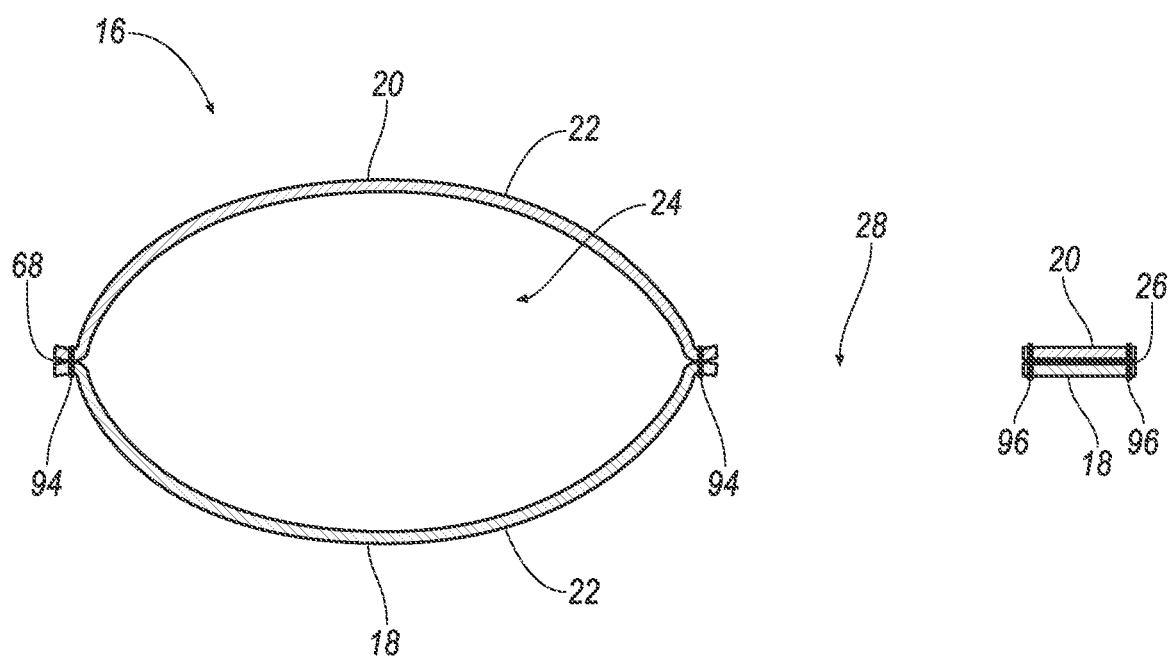
FIG. 5a is a cross sectional view of the airbag of FIG. 4.
Figure 5B:
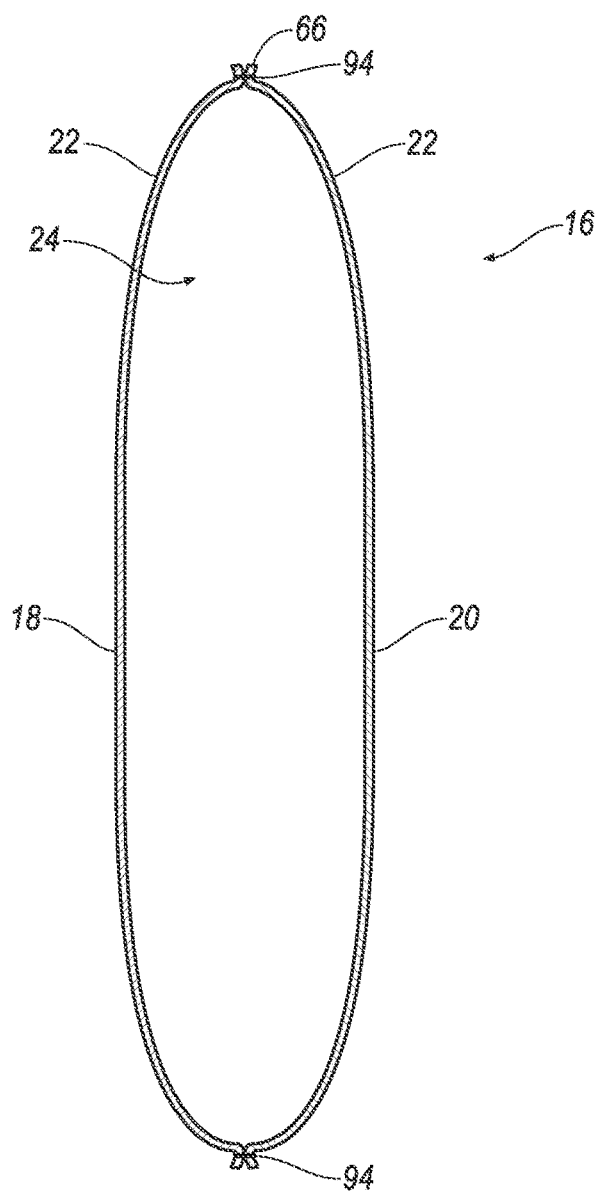
FIG. 5b is a cross sectional view of the airbag of FIG. 4.
Figure 5B:
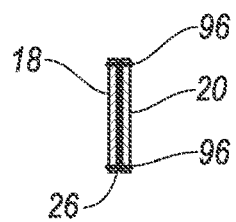

With reference to FIGS. 3 and 4, the non-expandable region 26 extends from the bottom edge 64 of the side airbag 16 to the bottom end 84 of the opening 28. The non-expandable region 26 extends from the vehicle-rearward edge 70 of the side airbag 16 to the vehicle-rearward end 90 of the opening 28.

The non-expandable region 26 extends continuously along the bottom edge 64 of the side airbag 16 from the vehicle-rearward edge 70 of the side airbag 16 to the vehicle-forward end 88 of the opening 28. The non-expandable region 26 extends continuously along the vehicle-rearward edge 70 of the side airbag 16 from the bottom edge 64 of the side airbag 16 to the top end 86 of the opening 28. "Extends continuously," means the non-expandable region 26 continues uninterrupted by an intermediate inflatable region.

The expandable region 22 extends from the top end 86 and the vehicle-forward end 88 of the opening 28. Specifically, the expandable region 22 extends upwardly from the top end 86 of the opening 28 to the top edge 66 of the side airbag 16, and the expandable region 22 extends vehicle-forward from the vehicle-forward end 88 of the opening 28 to the vehicle-forward edge 68 of the side airbag 16.

The vehicle 12 may include at least one impact sensor (not numbered) for sensing impact of the vehicle 12, and a computer in communication with the impact sensor and the inflator. The computer may activate the inflator, e.g., provide an impulse to a pyrotechnic charge of the inflators when the impact sensor senses an impact of the vehicle 12. Alternatively or additionally to sensing impact, the impact sensor may be configured to sense impact prior to impact, i.e., pre-impact sensing.

The impact sensor may be in communication with the computer. The impact sensor is configured to detect an impact to the vehicle 12. The impact sensor may be of any suitable type, for example, post-contact sensors such as accelerometers, pressure sensors, and contact switches; and pre-impact sensors such as radar, LIDAR, and vision-sensing systems. The vision-sensing systems may include one or more cameras, CCD image sensors, CMOS image sensors, etc. The impact sensor may be located at numerous points in or on the vehicle 12.

In operation, the side airbag 16 is inflated in response to a sensed vehicle impact. As set forth above, in the inflated position 30 the side airbag 16 is positioned to control the kinematics of the vehicle occupant 32. Specifically, in the inflated position 30, the opening 28 and the non-expandable region 26 are positioned to be adjacent to portions of iliac wing 78 of the side impact dummy 34. The non-expandable region 26 of the side airbag 16 assists in controlling the shape of the side airbag 16 during inflation and in the inflated position 30. Specifically, the non-expandable region 26 assists in positioning the vehicle-forward end 88 and the top end 86 forward and above of the iliac wing 78.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
a seatback; and
a side airbag supported by the seatback;
the side airbag having a first panel and a second panel, the first panel and the second panel having an expandable region including an inflation chamber, and the first panel and the second panel being connected to each other defining a substantially non-expandable region; and
the first panel and the second panel being connected to each other around an opening, the opening extending through the first panel and the second panel, the opening being between and adjacent to the substantially non-expandable region and the expandable region.

2. The assembly of claim 1, wherein the non-expandable region is at a bottom, vehicle-rearward corner of the side airbag.

3. The assembly of claim 1, wherein the side airbag has a bottom edge and a vehicle-rearward edge and the non-expandable region extends along the bottom edge and the vehicle-rearward edge.

4. The assembly of claim 3, wherein the opening has a bottom end and a vehicle-rearward end, and the non-expandable region extends from the bottom edge of the side airbag to the bottom end of the opening and the non-expandable region extends from the vehicle-rearward edge of the side airbag to the vehicle-rearward end of the opening.

5. The assembly of claim 4, wherein the opening has a vehicle-forward end, and the non-expandable region extends continuously along the bottom edge of the side airbag from the vehicle-rearward edge of the side airbag to the vehicle-forward end of the opening.

6. The assembly of claim 5, wherein the opening has a top end, and the non-expandable region extends continuously along the vehicle-rearward edge of the side airbag from the bottom edge of the side airbag to the top end of the opening.

7. The assembly of claim 6, wherein the expandable region extends from the top end and the vehicle-forward end of the opening.

8. The assembly of claim 4, wherein the opening has a top end, and the non-expandable region extends continuously along the vehicle-rearward edge of the side airbag from the bottom edge of the side airbag to the top end of the opening.

9. The assembly of claim 1, wherein the side airbag is designed to be positioned in an inflated position with the opening substantially aligned with an iliac wing of a side-impact dummy.

10. The assembly of claim 9, wherein the side airbag is designed to be positioned in the inflated position with the expandable region extending from the opening along a torso and leg of the side-impact dummy.

11. A side airbag comprising:
a first panel and a second panel, the first panel and the second panel having an expandable region including an inflation chamber;
the first panel and the second panel being connected to each other defining a substantially non-expandable region; and
the first panel and the second panel being connected to each other around an opening, the opening extending through the first panel and the second panel, the opening being between and adjacent to the substantially non-expandable region and the expandable region.

12. The assembly of claim 11, wherein the non-expandable region is at a bottom, vehicle-rearward corner of the first panel and the second panel.

13. The assembly of claim 11, wherein the first panel and the second panel have a bottom edge and a vehicle-rearward edge and the non-expandable region extends along the bottom edge and the vehicle-rearward edge.

14. The assembly of claim 13, wherein the opening has a bottom end and a vehicle-rearward end, and the non-expandable region extends from the bottom edge of the first panel and the second panel to the bottom end of the opening and the non-expandable region extends from the vehicle-rearward edge of the first panel and the second panel to the vehicle-rearward end of the opening.

15. The assembly of claim 14, wherein the opening has a vehicle-forward end, and the non-expandable region extends continuously along the bottom edge of the first panel and the second panel from the vehicle-rearward edge of the first panel and the second panel to the vehicle-forward end of the opening.

16. The assembly of claim 15, wherein the opening has a top end, and the non-expandable region extends continuously along the vehicle-rearward edge of the first panel and the second panel from the bottom edge of the first panel and the second panel to the top end of the opening.

17. The assembly of claim 16, wherein the expandable region extends from the top end and the vehicle-forward end of the opening.

18. The assembly of claim 14, wherein the opening has a top end, and the non-expandable region extends continuously along the vehicle-rearward edge of the first panel and the second panel from the bottom edge of the first panel and the second panel to the top end of the opening.

19. The assembly of claim 11, wherein the first panel and the second panel is designed to be positioned in an inflated position with the opening substantially aligned with the iliac wing of a side-impact dummy.

20. The assembly of claim 19, wherein the first panel and the second panel is designed to be positioned in the inflated position with the expandable region extending from the opening along a torso and leg of a side impact dummy.

* * * * *